(12) United States Patent
Chow (10) Patent No.: US 6,600,498 B1
(45) Date of Patent: Jul. 29, 2003

(54) METHOD, MEANS, AND DEVICE FOR ACQUIRING USER INPUT BY A COMPUTER

(75) Inventor: Chunghen Chow, Austin, TX (US)

(73) Assignee: Intenational Business Machines Corporation, Armonk, NY (US)

( * ) Notice: Subject to any disclaimer, the term of this patent is extended or adjusted under 35 U.S.C. 154(b) by 0 days.

(21) Appl. No.: 09/409,374

(22) Filed: Sep. 30, 1999

(51) Int. Cl.[7] ................................................ G06F 3/00
(52) U.S. Cl. ...................................... 345/769; 345/816
(58) Field of Search ................................ 345/700, 744, 345/745, 764, 769, 770, 780, 781, 810, 811, 816, 825, 835, 839, 840

(56) References Cited

U.S. PATENT DOCUMENTS

| | | | | |
|---|---|---|---|---|
| 4,862,390 A | * | 8/1989 | Weiner | 345/168 |
| 5,125,071 A | * | 6/1992 | Ozeki | 345/811 |
| 5,263,174 A | * | 11/1993 | Layman | 345/841 |
| 5,465,358 A | * | 11/1995 | Blades et al. | 345/707 |
| 5,617,527 A | | 4/1997 | Kressin et al. | 345/840 |
| 5,630,080 A | * | 5/1997 | Malamud et al. | 345/769 |
| 5,726,688 A | * | 3/1998 | Siefert et al. | 345/808 |
| 5,818,437 A | * | 10/1998 | Grover et al. | 345/811 |
| 5,914,714 A | * | 6/1999 | Brown | 345/769 |

* cited by examiner

Primary Examiner—Crescelle N. dela Torre
(74) Attorney, Agent, or Firm—Arnold & Associates; Leslie Van Leeuwen (57) ABSTRACT

The field of invention relates to a method, means, and device for acquiring user input by a computer and, more particularly, a new and improved method of customizing a user interface to each specific task performed by a user such that the user interface customizes itself without the user having to modify multiple sets of preferences.

29 Claims, 7 Drawing Sheets

METHOD, MEANS, AND DEVICE FOR ACQUIRING USER INPUT BY A COMPUTER

BACKGROUND OF THE INVENTION

1. Field of the Invention

The field of invention relates to a method, means, and device for acquiring user input by a computer and, more particularly, a new and improved method of customizing a user interface to each specific task performed by a user such that the user interface customizes itself without the user having to modify multiple sets of preferences.

2. Description of the Related Art

Contemporary software programmers realize that no matter how good a software program is or powerful a tool a software program becomes when operating on the correct hardware, the extent that the software program permeates the market is limited substantially by the quality of the user interface. For example, a user may prefer to purchase a software program that is very simple to use rather than a more powerful software program that is very hard to use because the user has performed a cost benefit analysis and realizes that the loss of time that results from using the less powerful software program is less than the amount of time lost each time the user has to figure out how to use the more powerful software program.

In an effort to increase sales, software program user interfaces have increased in what is called "user-friendliness". The "user-friendliness" of a software program is the scale by which users tend to measure a software program's ease of use and the scale is time frame sensitive in that what may have been considered user friendly ten years ago, would not be considered so today. Today, for example, a software program that requires a user to memorize several key combinations to perform software program functions would rank low in the "user-friendliness" scale, whereas a software program that sets up a command structure such that a user intuitively knows how to perform software program functions would rank high on the "user-friendliness" scale.

User interfaces have increased in complexity and "user-friendliness" since the early main frame computers through a combination of hardware and software developments. When main frame computers first became popular, key cards and printouts composed the user interface. The user was required to enter data on a key card to input the data into the computer. The user had to physically punch holes in the key cards in a particular way. Thus, if the user punched a hole in the wrong place then the user would have to reenter all the information on a new key card. This user interface may have been relatively user friendly at that time but is not considered so today.

The first big break through in "user-friendliness" with regards to hardware, was the combination of the display and keyboard. The keyboard and display allowed a user to see the data in a recognizable format as it was being entered into the computer. Errors could then be detected and corrected much more quickly. The software program user interfaces were slow to take advantage of the keyboard and display combination however. For example, some of the original user interfaces that developed were add-ons to the earlier key card interfaces such that a user had to enter information in exactly the same format as he did for the key cards, but the information was typed at specific coordinates on the display rather than being holes punched in specific places on a key card. Still, if the user made an error typing the data into a specific location, e.g. typed the information one character to the left or one character to the right of where it was supposed to be typed, the computer rejected the entry and required the user to reenter the information. The software finally began to catch up to the keyboard and display hardware combination with the use of a command line and script window. The command line allowed the user to enter commands which initiated a specific or a sequence of specific software program functions. The script window returned the results of a command to a user immediately and allowed the user to review prior actions by scrolling the commands and results upward as new commands and results were displayed. In addition, the "user-friendliness" of data entry was improved by allowing users to enter information one field at a time, informing the user when a field was entered in an incorrect format, and requiring the user to reenter only the fields, or characters within a field that were wrong rather than making the user reenter the entire data record.

The second big break through in regards to computer hardware for user interfaces was the mouse. The mouse allows the user to point at something on the display and select it by pressing a button on the mouse. The simultaneous response of the software was command menu systems. The command menu system in combination with the mouse, command line, keyboard and display, allowed users to select from a categorized menu of commands, the command the user desired to execute. The command menu systems were primarily character representations of software program functions. Later, graphical user interfaces (GUI's) were developed. GUI's, still in use today, depict functions with graphics. The graphics give the software programmer the opportunity to fit more software program functions on a display, as well as allow the user to scan through the command functions more quickly, since the graphic or pictorial descriptions can be more compact and more descriptive than their character counterparts.

GUI's seem to offer the best user interfaces to date when combined with the menu command system in operating systems such as MacOS™ and Windows™ and in software applications programs. The combined menu command system and GUI, however, still have a shortfall. To begin with, the increasing complexity of software programs along with the increasing diversity of projects for which the users use software programs and the proliferation of computer users, has made a well-tailored user interface, up until now, practically impossible. In addition, software programmers writing software applications are including an enormous number of software program functions, creating a default menu command system and tool bar, and allowing the user to customize the user interface by allowing the user to select the functions that are to be available in the menu command system and tool bar. In some software applications such as Auto Cad™, along with allowing the customization of a menu command system, the software program allows customization commands available on a digitizer tablet and offers a command line in which a user can type any command available from the software program. The shortfall with these user interfaces, however, is that the amount of time required to customize an interface from the user is so great that a user rarely customizes the interface for a specific project. Thereby, the user trades off the inefficiency for each individual project for a smaller but overall gain in efficiency for all the user's projects.

A further example of a software program attempting to take advantage of the keyboard, mouse, and display is U.S. Pat. No. 5,617,527 issued to Kressin et al., on Apr. 1, 1997, entitled METHOD FOR ADDING A GRAPHICAL USER INTERFACE TO A COMMAND LINE APPLICATION. Kressin introduces the patent in the abstract as a method that improves the user friendliness of command line driven programs. Kressin creates a button GUI window that contains buttons related to a command table. When a button is selected, the invention generates keystrokes emulating a command being entered via a keyboard. Although this does take advantage of the mouse, it does not solve the problems discussed above, i.e. how to deal with more software program functions than can fit on the display without requiring the user to spend enormous amounts of time setting up the interface. Alternatively, Kressin can be viewed as a modification for software programmers only, as is implied by the specification objectives. In such a case, the program loses flexibility and is not well-tailored to the particular application of a user.

A still further example of a software program attempting to take advantage of the keyboard, mouse, and display is the hypertext function offered in many word processing programs including recent versions of e-mail editors for popular browsers. The hypertext software program function is useful, but relatively very limited. For example, the hypertext function will recognize some set formats for web sites and files but will not recognize other commands, links, and objects.

While the aforementioned prior art has some areas of effectiveness, it does not sufficiently address the needs of software programmers and software program users, and there is a great need for a better device and method.

SUMMARY OF THE INVENTION

According to one aspect of the invention, a method for acquiring user input by a computer having a command input device, a selection device and a display device, comprising receiving an input, displaying a representation of the received input on the display device, attaching at least a drag and drop function to the displayed representation of the received input on the display device, and executing an attached function upon selection of the displayed representation of the received input.

According to another aspect of the invention, a device for acquiring user input by a computer having a command input device, a selection device and a display device, comprising receiving an input, displaying a representation of the received input on the display device, attaching at least a drag and drop function to the displayed representation of the received input on the display device, and executing an attached function upon selection of the displayed representation of the received input.

According to another aspect of the invention, a device for acquiring user input by a computer having a command input device, a selection device and a display device, comprising an input receiver communicatively connected and responsive to the command input device and the selection device, a representation of an input suitable for display on the display device and responsive to the input receiver, a function, a function attachment device communicatively connected to the representation of an input, and a function executing device communicatively connected to the input receiver, and the function wherein the function executing device is responsive to the input receiver and the function is responsive to the function executing device.

These and other aspects of the invention solve various problems in the prior art. The present invention utilizes the optional layers of command lines, scripts and/or buttons depending upon the user's preferences. Each command layer can be set up in accordance with the user's preference to learn a number of frequently used software program functions. The command layers can learn global software program functions, such as operating system program functions and/or software program functions for a specific application, such as a word-processing application, and task such as a technical analysis of subcontractor bid documents. As such each user project can be worked upon utilizing a user interface literally tailored for that specific project without having to take enormous amounts of time customizing the user interfaces.

Further, although a good aspect offered by common hypertext functions is format recognition such that the format of a web site is recognized even without a search to determine if the web site exists, some embodiments of the present invention recognize a large variety of user-defineable commands, links, and objects such as files, groups of files, documents, e-mail addresses, web site addresses, Internet protocol addresses, hardware devices (such as printers, CD ROM drives, printers, zip drives, hard drives, networked computers), and the like, without a search to determine if the object, link, or command exists. Embodiments of the present invention recognize formats and begin searching for a corresponding object, group of objects, device, group of devices, locations, . . . until a complete listing is generated. In addition, other embodiments of the present invention also offer a drag and drop function, unavailable with any hypertext software program function, that allows the object represented or the representation of the object to be manipulated by the user.

The foregoing and other objects, features and advantages of the invention will be apparent from the following more particular description of an example embodiment of the invention, as illustrated in the accompanying drawing wherein like reference numbers represent like parts of the embodiment of the invention.

DETAILED DESCRIPTION

Figure 1:
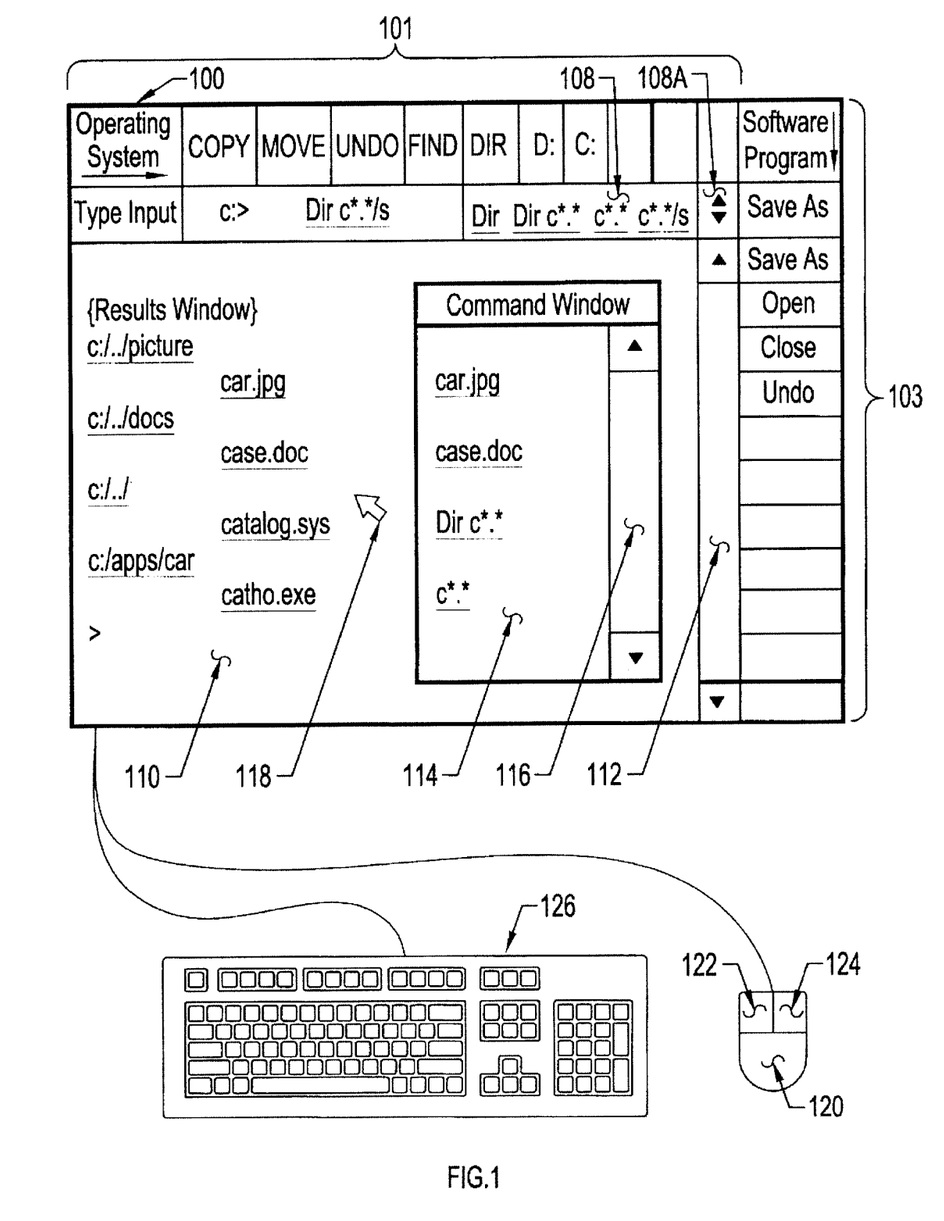
FIG. 1 depicts a first display of an example embodiment of the invention.

Referring to FIG. 1, there is shown an example embodiment of the present invention comprising a computer and display device 100, a command input device 126 in the form of a keyboard, and a selection device 120 in the form of a mouse. FIG. 1 depicts a screen shot of an example embodiment of the present invention that runs as a shell or high memory program while the user is running in an operating system or in a software application running on an operating system, in a manner well known to those of skill in the art. More specifically, FIG. 1 depicts a screen shot of a moment in time after a user entered a command, "Di" along with a carriage return, in the command script window 105. To describe the present invention, the steps the user took to reach the moment portrayed, as well as, examples of the options offered to the user at the moment in time portrayed in FIG. 1 are explained below.

Figure 3:
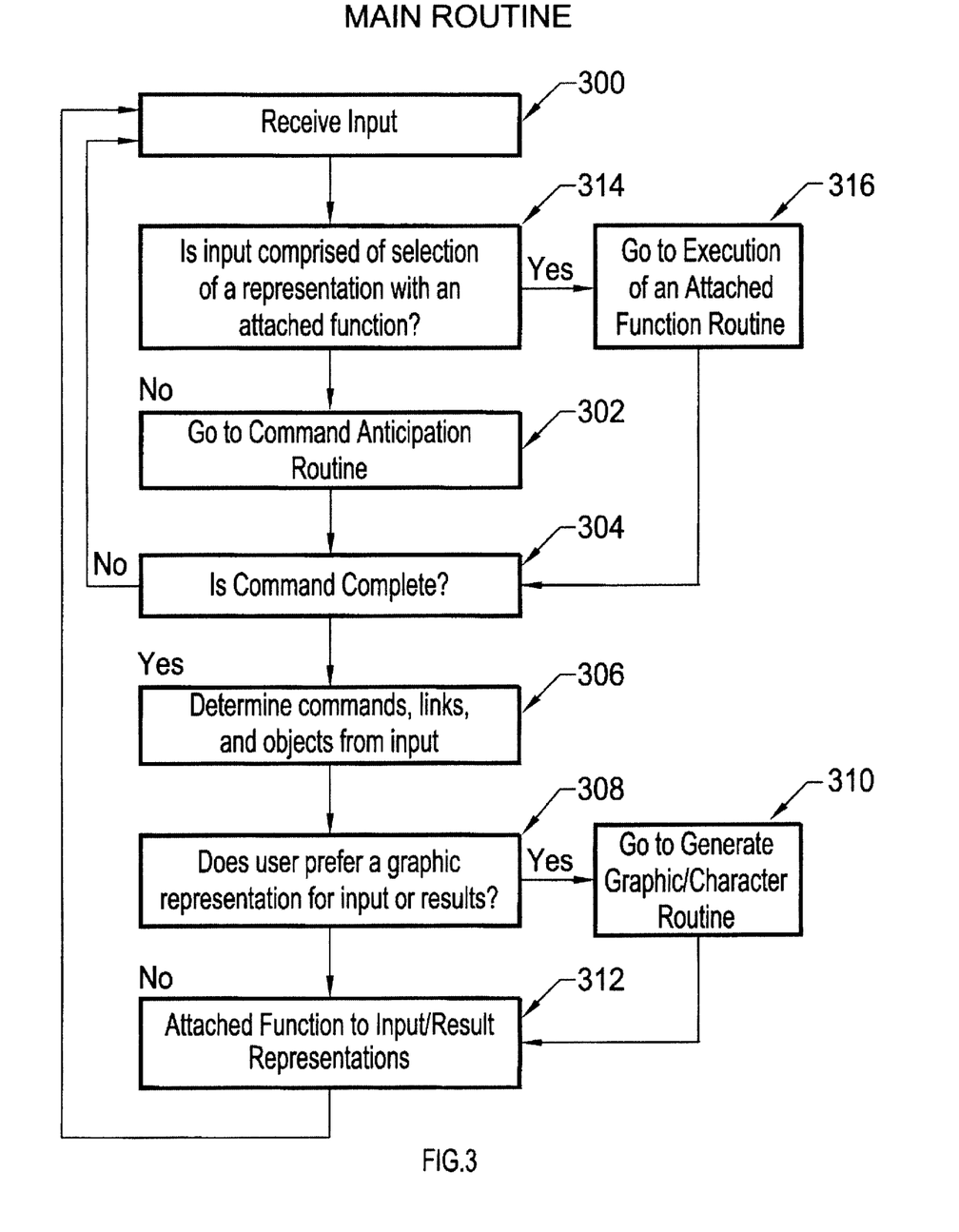
FIG. 3 depicts a flow chart of the operation of an example embodiment of the invention.
Figure 4:
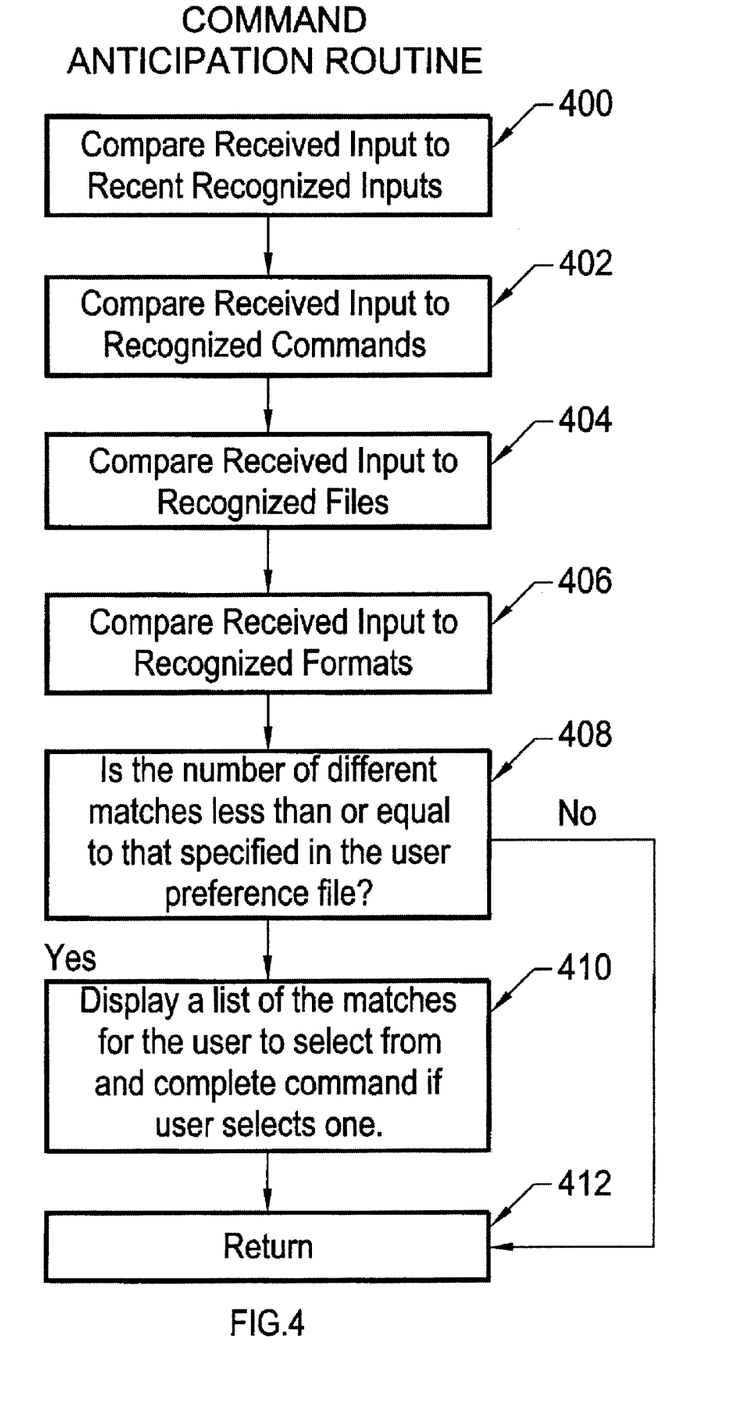
FIG. 4 depicts a flow chart of an optional enhancement of an example embodiment of the invention.

Referring to FIGS. 1, 3, and 4, the user entered each character of his input, "D" and "i", on a command input device 126, represented by a keyboard in the present embodiment of the invention. The first step of the main routine in this example embodiment, receive input 300, receives each character as the key is pressed on the keyboard and transfers the entire input to a means for anticipating a complete input, for example, the command anticipation routine 302. In the present example, the command anticipation routine received "D". Then, prior to the command anticipation routine offering options to the user or instead of selecting an option, the user input "i", at which time the command anticipation routine received "Di", in a manner well known to those of skill in the art. In this case the command anticipation routine in FIG. 4 compares the command to recent recognized inputs 400 which results in outputs of "dir" and "dir c*.*/s" to an output buffer, in a manner well known to those of skill in the art. In the next step the received input is compared to recognized commands 402. In the case that the user is typing commands to execute software program functions of the operating system, such as the present example embodiment, the comparison to recognized commands 402 compares the input "Di" to commands of the operating system. The comparison to recognized commands outputs "dir" and "directory" to the output buffer. Next, the input "Di" is compared to the recognized files 404. The only recognized files in this example are "diskcopy.com" and "display.sys" which are output to the output buffer. Next, the input "Di" is compared to recognized formats 406. This is a catchall type comparison to determine if the input is in a recognized format. In the present example embodiment, the input is compared to example formats of files, Internet addresses, links to an object, links to a group of objects, e-mail subjects, e-mail addresses, database entries, device names, device locations, and the like. At the end of the comparison, the output is "Di" which is either a command, filename, e-mail address, e-mail subject, database entry, or link. Upon completion of the comparison steps 400–406, the command anticipation routine compares the number of different results from each of the comparisons to the number the preference file marked as the maximum number of choices to offer the user 408. In the present example embodiments the maximum number of different results is ten, a default preference setting for the present example embodiment, well known to those of skill in the art. The number of different outputs include "dir", "dir c*.*/s", "diskcopy.com", "display.sys", and "Di" since "dir" and "directory" both execute the same software program function. Therefore, the five results are displayed to the user 410, "Dir c*.*/s" is chosen by the user, the command anticipation routine ends by returning to the main routine 412, and the input is complete 304. If the number of matches in step 408 exceeded the maximum number set in the preference file then the command anticipation routine returns to the main routine 412 and the main routine waits to receive additional input 300. Upon entry of each input, in the present example embodiment, a character representation of the input is displayed on the display device on the command line 107. Also, upon completion of the input by the command anticipation routine in FIG. 4, the character representation of the input is completed and highlighted to indicate at least a drag and drop function has been attached to the commands, in a manner well known to those of skill in the art. In the next step, the number of different objects, links, and file names are split out of the complete input 306 and placed in the input window 108. In the present example, the commands "dir" and "dir c*.*" and the representations for a group of objects, "c*.*" and "c*.*/s" have been split out of the input command "Dir c*.*/s". Therefore, five inputs, one in the "Type Input" window 105 and four in the input window 108 are displayed. The scroll arrows 108A in input window 108 allow a user to view prior inputs along with split out commands, links, or objects.

In alternative embodiments of the present invention, a list of functions is not offered by the means for anticipating a complete input, but the input is completed upon recognition in accordance with user preferences, in a manner well known to those of skill in the art. For example, in an alternative acceptable embodiment of the invention, the user specifies that an input will be completed when only one match is output in steps 402–408 of the command anticipation routine in FIG. 4.

A further acceptable alternative embodiment of the present invention includes a window on the display device that displays all of the outputs from each comparison in steps 402–408 of the command anticipation routine in FIG. 4.

Referring again to FIG. 4, the command anticipation routine of the present embodiment is very simple and general and many alternative command anticipation routines are available and can be designed to customize example embodiments of the invention, in a manner well known to those of skill in the art, to other types of users and/or other types of computer uses, considering the types of applications and operating systems being executed.

Referring to again to FIGS. 1 and 3, the results of the completed command "Dir c*.*/s" are shown in the results window 110. The results include files from several subdirectories related to a web site being constructed by the user. The web site name is "car" and by executing the instruction "Dir c*.*/s", the user has created an object, "c*.*/s", in the input window 108 associating all of these files, in a manner well known to those of skill in the art. The next step of the main routine of the present embodiment in FIG. 3 is to check whether the user prefers graphical representations or character representations 308 for the input in the "Type Input" windows 105 and 108 and the results in the results window 110. In the present example embodiment, the user chose a preference to have character representations for the input and result representations.

Figure 5:
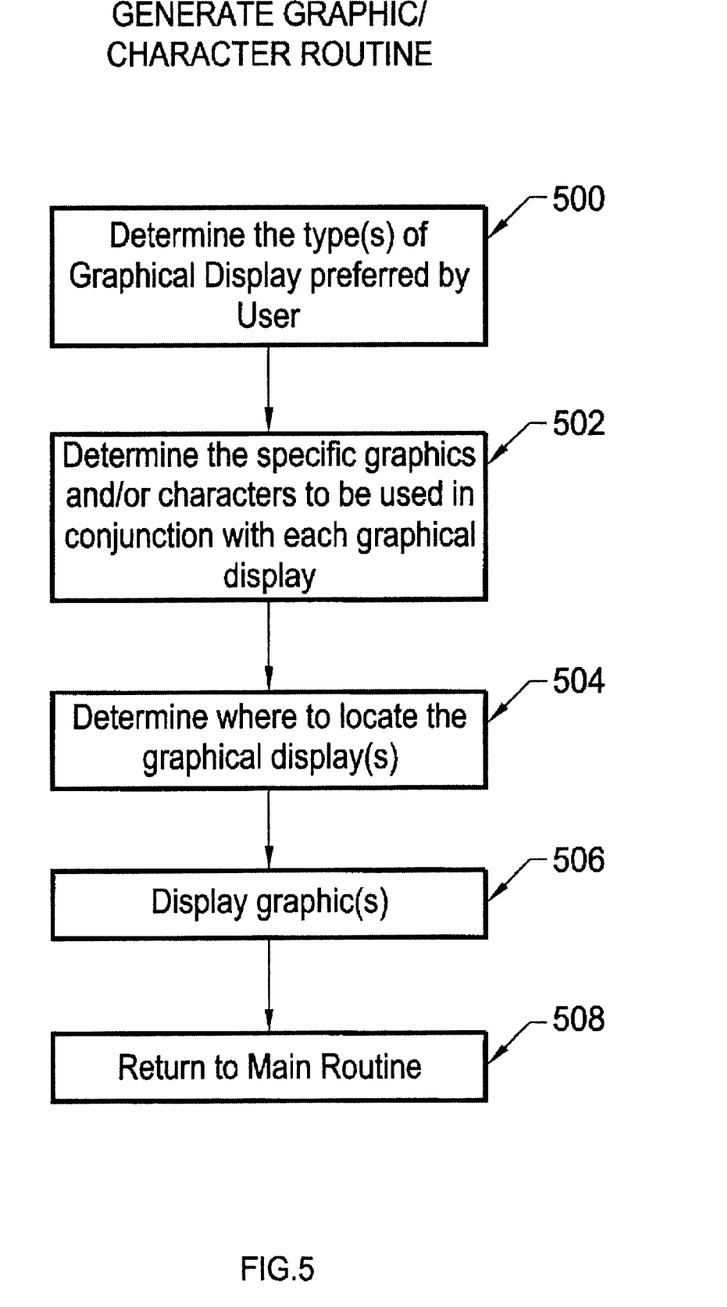
FIG. 5 depicts a flow chart of an optional enhancement of an example embodiment of the invention.

In alternative acceptable embodiments of the present invention a means for generating a graphic and/or character representation is implemented, such as the software program routine in FIG. 5. In the first step of the generate graphic routine, determine the type(s) of graphical display preferred by user 500, the routine determines whether the user prefers graphic or character representations for the input and results comprising, in some embodiments of the invention, distinctions between commands, files, Internet protocol addresses, web sites, files, groups of files, other objects, other groups of objects, hard drives, printers, CD ROM drives, floppy disk drives, dvd drives, e-mail addresses, e-mail subjects, groups of e-mail addresses, printer locations, networked computers, and memory allocations. In further embodiments, additional distinctions are made. In the second step of the example means for generating a graphic/character representation, determine the specific graphics and /or characters to be used in conjunction with each graphical display 502, the software routine requests the user choose from a group of graphics and character representations, the representation preferred by the user for each input and/or result. In the third and fourth steps, determine where to locate the graphical display (s) 504 and display graphic(s) 506, the software routine, unless otherwise specified by the user in a preference file, locates and displays all of the representations in the command window 114, in a manner well known to those of skill in the art.

Further alternative embodiments of the present invention comprise a means for generating a graphic representation that includes a picture drawing package such that a user can draw a representation to be used to represent commands, links, objects, . . . , in a manner well known to those of skill in the art.

Referring still to FIGS. 1 and 3, when a user prefers a character representation 308, the next step of the main routine, attach function to input/result representations 312, stores a reference associated with each representation of an input and/or result noting the functions available upon selection of the representation and highlights each representation by, for example, underlining the text, as shown in FIG. 1, such that a user easily identifies the text with attached functions, in a manner well known to those of skill in the art. In the present embodiment, a drag and drop function is included with each input and result function in the "Type Input" window 105, input window 108, and results window 110. With respect to "Dir c*.*/s" in the "Type Input" window 105 and "Dir" and "Dir c*.*" in the input window 108, an execute command function is also attached such that a user can execute the command associated with each representation upon selection. The drag and drop attached to each input and result representation can be used by holding the selection of a representation, for example, holding a mouse button 122 down after selecting a representation, and then dragging or moving the representation to a new location, window, or tool bar, in a manner well known to those of skill in the art. For instance, the command "Dir" in the input window 108 can be moved to the command window 114 by placing the pointer 118 above the "Dir" representation in input window 108 and pressing and holding a mouse button 122 down. While the mouse button 122 is continued to be held, the "Dir" representation freely follows the pointer 118. With respect to "c*.*" and "c*.*/s" in the input window 108, a means to manipulate objects, such as object manipulation functions, are attached by storing a reference indicating that certain object manipulations functions are available upon selection of the representation. The "c*.*" representation represents a group of objects which, in the present example, represents all the files in the current directory that begin with the letter "c", or "car.html", in a manner well known to those of skill in the art. The "c*.*/s" representation represents all the files in the current directory and in sub-directories of the current directory that begin with the letter "c". The functions attached to "c*.*" and "c*.*/s" include a copy representation function that duplicates the representation, a copy object function that duplicates an object associated with the representation, a move representation function that moves the representation, a move object function that moves an object associated with the representation, an open object function that opens an object associated with the representation, a delete object representation function that deletes the representation, a delete object function that deletes an object associated with the representation, a print object function that prints an object associated with the representation, a print object to screen function that prints an object associated with the representation to the display device, an attach object to e-mail function, an attach object representation to e-mail, a fax object function, a rename object representation function, and a rename object function. Alternative embodiments of the present invention include additional functions, a reduced set of functions, or a user-specified set of functions. For example, the user selects the "c*.*/s" representation and a list of functions are offered to the user, in a manner well known to those of skill in the art. The user chooses a copy object function. In the present example, "c*.*/s" represents four files in four different directories ( "c:/ . . . /picture/ car.jpg", "c:/ . . . /docs/car.doc", "c:/ . . . /car.html", "c:/ . . . /apps/car/car.exe") of the drive, "c:", as shown in the results window 110. The user then selects a destination as "D:" in the operating system tool bar 101 which is a representation of the hard drive designated as "D:". The result is that all four files, including the given file structure, are copied to the "D:" drive in a manner well known to those of skill in the art. In an alternative embodiment, however, the file structure is not copied along with the files in accordance with a default user preference, in a manner well known to those of skill in the art.

Referring again to FIGS. 1 and 3, in an alternative example to that posed above, the user inputs a command by selecting a representation of an input, such as "Dir" in the input window 108. The step, is the input comprised of a selection of a representation with an attached function 316, results in a "yes" and a means for executing an attached function is implemented. The means for executing an attached function in the present example embodiment is a software program function called the execution of attached function routine in FIG. 6.

Figure 6:
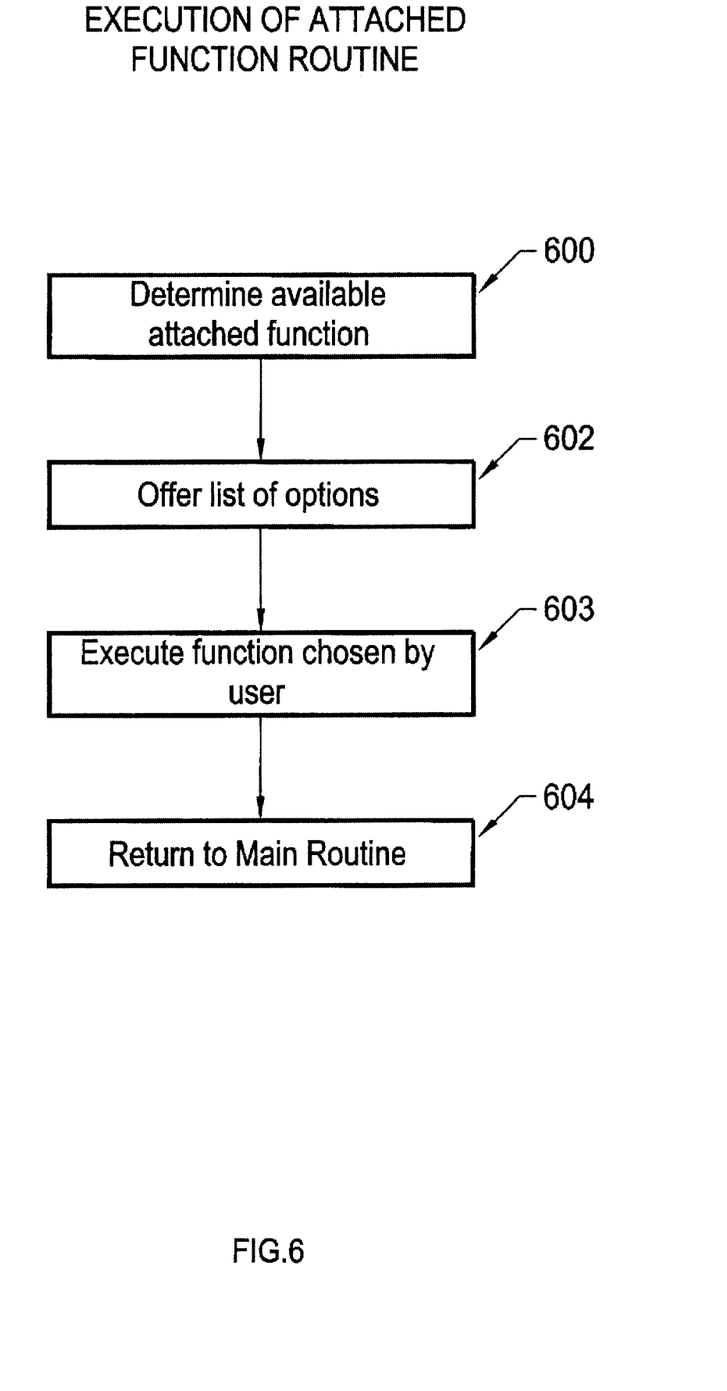
FIG. 6 depicts a flow chart of an aspect of an example embodiment of the invention.

Referring to FIG. 6, the first step, determine available attached functions 600, comprises a two step process in the present embodiment of the invention. First, the attached functions are determined by reading a reference associated with each representation of an input and/or result that contains a list of the functions that are attached or, in alternative embodiments, the functions that are not attached. Second, the attached functions that manipulate an object represented by the representation, only are executed after verification that the object exists and can be found. For example, the user selects a file that has an attached function. The file is recognized by the format only in step 406 of FIG. 4. A copy the object function is attached to the representation of the file on the display device. When the user selects the copy the object function, the present embodiment of the invention performs a find function to determine if the file is unique and the location of the file. If the file cannot be found, a location of the file is requested from a user, in a manner well known to those of skill in the art. If more than one file is found with the same file name, a user is requested to identify the correct file. If only one matching file is found or upon a file identification by the user, the object manipulation functions become available. In the next step, offer list of options to user 602, a list of the available options is presented to the user. The user then selects an option in a manner well known to those of skill in the art. In alternative embodiments, the user specifies short-cut inputs, in a manner well known to those of skill in the art, and the user has the option of supplying the input such that a specific function is selected without the necessity of choosing from a list of options. In further example embodiments, only a single function may be available to the user in which case the step 602 is bypassed. In the next step, execute function chosen by user 603, the user-specified function is executed. For example, if the user chooses to move the representation of the object or command, the user is requested to select the destination. At this point the user chooses the "D:" drive from an operating tool bar 101 or the command window 114, by selecting the "D:" button. In alternative, the user has the option of choosing a drive and/or path from a location upon which the user has located a representation of a drive or path or by typing in an input in the "Type Input" window 105. Lastly, the routine returns to the main routine in step 604.

Referring back to FIG. 1, in the present example embodiment of the invention a command bar 101 offers the user four of the most commonly used operating system software program functions and five functions of the user's choosing. In the present example, the four most commonly used software program functions are copy, move, undo, and find as represented in the operating system command bar 101. The software program functions are shown on the present example display as graphical representations of buttons having character descriptions of the software program function. More specifically, "COPY" in command bar 101 is a character description on a graphical button of a software program function that makes a copy of an object or an object's representation. An acceptable alternative embodiment of the invention is an embodiment that uses pictures in the form of graphics that describe the functionality of a software program function.

Referring still to FIG. 1, the user chose to eliminate certain functions from eligibility for the command bar such as open. Even though the user executes the open function often, the user desires alternative functions to be included in the command bar 101 since open function has been assigned to a double-click of the selection device, in a manner well known to those of skill in the art. The user thus can exclude the availability of the open function for placement in the command bar 101 by selecting a preference in a preference file. In addition, the user in the present example embodiment has also copied the "Dir" command into a user chosen position for software program functions in the command bar 101 by dragging the representation of the "Dir" command in the command window 108 to a blank slot in the operating system command bar 101. Further, two example device representations, "D:" and "C:", are shown in the operating system command bar 101. The functions attached to data storage devices such as these comprise an open object function that opens a window comprising the contents of the device, an erase object function that offers the user an option to erase the contents of the device, a copy to function that writes information to the device, an accept drop copy function that copies an object to the device when a representation of the object is dragged and dropped on the representation for the storage device, and a compare file structure function that compares the files stored on the device to the files stored on a second device and outputs the differences by methods well known to those of skill in the art. Some alternative embodiments offer additional functions, while other alternative embodiments of the present invention offer a reduced set of attached functions to storage devices.

The present embodiment of the invention also recognizes, for example, local printers, network printers, local modems, network modems, local hard drives, network hard drives, local video cards and other network hardware including other computers that are recognizable by a network. The present embodiment recognizes device names attached to each device by a user or by a network provider or administrator and physical designations such as serial numbers imprinted in ROM on ethernet cards, and attaches functions to representations on the display device such as the data storage devices discussed above. The software program functions available to be attached to the device representations in a computer network are numerous and are well known to those of skill in the art.

An alternative embodiment of the present invention has an operating system command bar 101 set up for each different operating system that is available on a computer. A further example embodiment has an operating system command bar 101 containing the most commonly used functions from all of the available operating systems on a computer.

Referring again to FIG. 1, there is shown a software application program command bar 103. The software application program command bar 103 is set up similarly to the operating system command bar 101. In an alternative embodiment of the invention the software application program command bar is set up differently from the operating system command bar 101 such as, for example, being set in a pull down menu rather than a tool bar, by way of a separate set of user preferences, in a manner well known to those of skill in the art. The software application program command bar 103, however, collects the most commonly used functions within a specific software application program as well as user specified software application program functions. In an alternative embodiment, one software application command bar 103 is set up to collect the most commonly used commands for all software application programs used on the computer.

Another acceptable alternative embodiment includes a set of operating system command bars 101 and software application program command bars 103 for each user. Still another alternative acceptable embodiment of the present invention includes a pull down and/or pop up menu rather than a command bar 101 or 103.

Referring still to FIG. 1, there is shown a command window 114 in the present example embodiment of the invention. The user in the present example has chosen to have a command window 114 with a scroll bar 116 such that representations are placed in the window at the user's behest by dragging representations into the window or by implementing a copy function attached to a representation and selecting the command window 114 as the destination for the copy. The command window 114 is scrolled up or down by selecting a corresponding arrow in the scroll bar 116 to allow additional space to add representations such as "case.doc", "car.jpg", "Dir c*.*", and "c*.*". Further, in the present example embodiment of the invention, the user saves the contents of the command window 114 to a text file or a text file comprising text objects and references associated with the objects in the command window 114. In addition, text files containing objects, commands, links, . . . or text files containing the same along with associated references are imported into the command window 114 upon selection of such command by the user in a manner well known to those of skill in the art.

Figure 2:
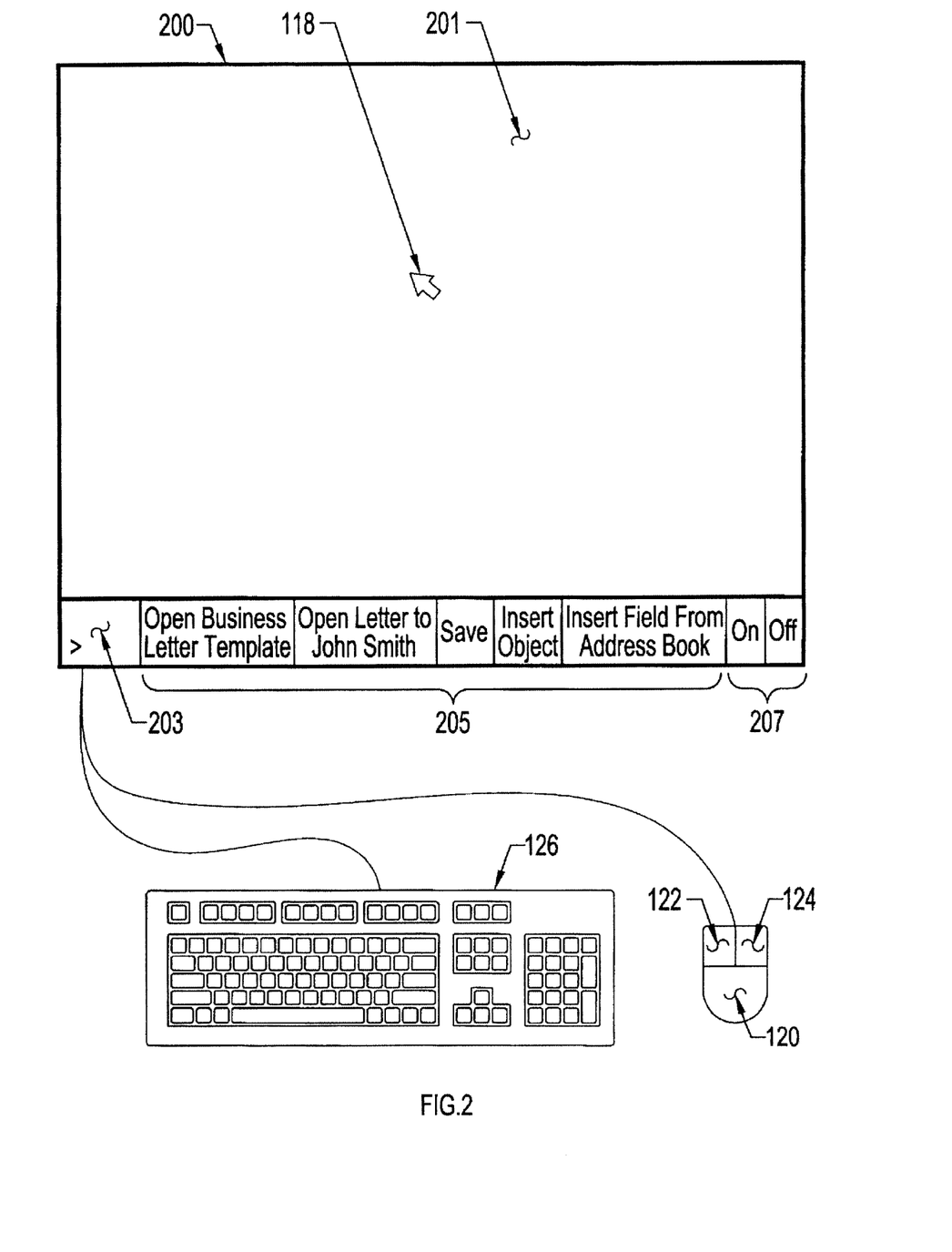
FIG. 2 depicts a second display of an example embodiment of the invention.

Referring now to FIG. 2, there is shown a second example embodiment of the present invention. In the portrayed example, the embodiment of the invention functions only during the execution of a software application program in a manner well known to those of skill in the art. The portion of the display available to the software application program 201 is limited such that a input window 203, a software application program command bar 205, and a command bar on/off button 207 is displayed at the bottom edge of the display device without interfering with the operation of the software application program, in a manner well known to those of skill in the art. As discussed in connection with the command tool bars 101 and 103 in FIG. 1, the command bar 205 captures the five most common inputs by the user. The user in the present example embodiment also has the option of turning on or off a command window with the on/off button 207, in a manner well known to those of skill in the art.

In an alternative embodiment, the invention functions only during the execution of an operating system, in a manner well known to those of skill in the art.

In yet another example embodiment, the software application program command bar, pop up menu, or pull down menu is available to a user while the software application program is not being executed. This example embodiment of the invention stores a reference associated with the representation of an object, link, command or menu, to the software application program in which the representation was created. When a user selects a representation of a function of a software application program that is not currently being executed, the present embodiment of the invention executes the software application program prior to executing the software application program function, in a manner well known to those of skill in the art.

Figure 7:
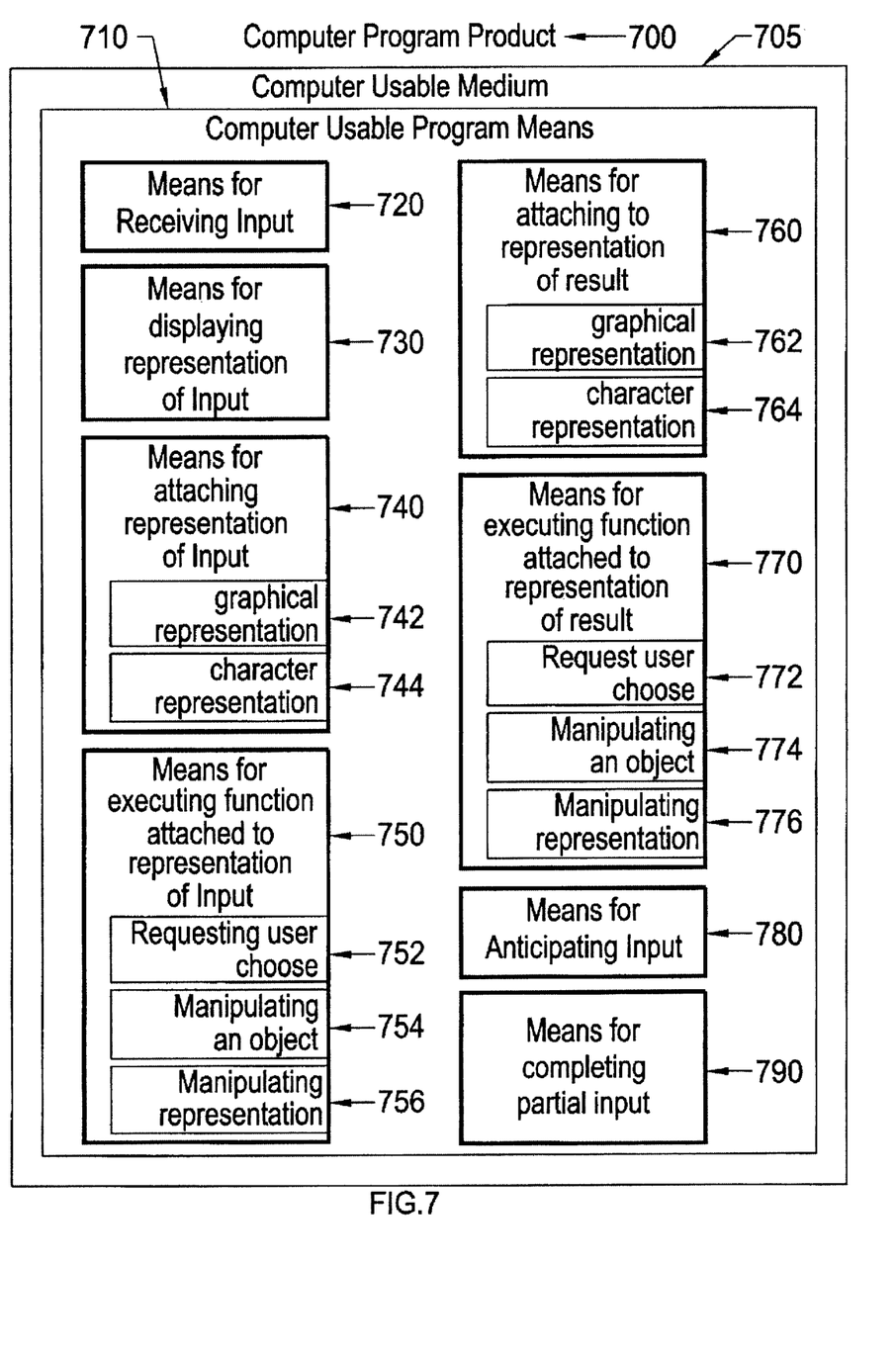
FIG. 7 depicts an example embodiment of the invention in a medium.

Referring now to FIG. 7, there is shown an example embodiment of the present invention as a computer program product 700 having a computer usable medium 705, e.g. a DVD, CD, hard drive, tape, floppy disk, RAM drive, or similar data storage and/or retrieval medium. In addition, the present example embodiment is communicatively connected to a computer functioning as a web site server, which is communicatively connected to a computer network.

The computer usable medium 705 comprises a computer usable program means 710, such as a computer software program, embodied therein for acquiring user input. In some embodiments of the present invention, the computer usable program means 710 comprises a means 720 for receiving an input such as a computer software routine that prompts a user, a means 730 for displaying a representation of a received input such as a computer software program that generates graphic or character representations of an input, a means 740 and 760 for attaching a function to a representation of the input and result such as computer software programs that store in memory a representation of functions available upon selection of the representation of the input or result, a means 750 and 770 for executing a function attached to a representation of an input and result such as computer software programs that request a selection by the user from a list of software program functions, a means 780 for anticipating a complete input from a partial input, such as a "parser" computer software program, as is well known to those of skill in the art, and a means 790 for completing a partial input such as a computer software routine that compares the partial input to commands, file names, device names, web site names, hardware addresses, memory addresses, web site addresses, and the like, dependent upon what is prefereable for an application or type of use.

In further embodiments of the present invention, the means 740 for attaching a software program function to a representation of an input comprises a means 742 for attaching a software program function to a graphical representation of an input. In yet other example embodiments of the invention, the means 740 comprises a means 744 for attaching a function to a software program function to a character representation of an input. Similarly, in some embodiments of the invention, means 760 for attaching a software program function to a representation of a result comprises a means 762 and/or 764 for attaching a function to a software program function to a graphical or character representation of a result.

In still further example embodiments of the invention, means 750 comprises a means 752 for requesting a user to choose a software program function, a means 754 for manipulating an object associated with a representation of an input, and/or a means 756 for manipulating a representation of an input, in a manner well known to those of skill in the art. In addition, some embodiments comprising a means 770 for executing an attached software program function comprise a means 772 for requesting a user to choose a software program function, a means 774 for manipulating an object associated with a representation of a result, and/or a means 776 for manipulating a representation of a result, in a manner well known to those of skill in the art.

It will be understood from the foregoing description that various modifications and changes may be made in the example embodiment of the present invention without departing from its true spirit. It is intended that this description is for purposes of illustration only and should not be construed in a limiting sense. The scope of this invention should be limited only by the language of the following claims.

What is claimed is:

1. A method for acquiring user input by a computer having a command input device, a selection device and a display device, comprising:

receiving an input;

displaying a representation of said received input on the display device;

attaching at least a drag and drop function to said displayed representation of said received input on the display device;

attaching another function to the representation of a result of said received input on the display device; and executing said attached at least a drag and drop function upon selection of said displayed representation of said received input.

2. The method according to claim 1 further comprising:

executing said attached another function upon selection of the representation of the result.

3. The method according to claim 1 further comprising:

anticipating a complete input from a partial received input; and completing the partial received input wherein the receipt of additional input is not required.

4. The method according to claim 3 further comprising anticipation of a sequence of inputs.

5. The method according to claim 1 in which said receiving an input, comprises entering an input on the command input device.

6. The method according to claim 1 in which said receiving an input, comprises entering an input with the selection device.

7. The method according to claim 1 in which said attaching at least a drag and drop function to a representation of said received input on the display device, comprises attaching a function to a character representation of said received input.

8. The method according to claim 1 in which said attaching at least a drag and drop function to a representation of said received input on the display device, comprises attaching a function to a graphical representation of said received input.

9. The method according to claim 1 in which said attaching at least a drag and drop function to a representation of said received input on the display device, comprises attaching a function to a representation of said received input comprising a combination of graphics and characters.

10. The method according to claim 1 in which said attaching at least a drag and drop function to a representation of said received input on the display device, comprises attaching a function to relate an object to a representation of said received input.

11. The method according to claim 1 in which said executing an attached at least a drag and drop function upon selection of the representation of said received input, comprises manipulating the representation of said received input on the display device.

12. The method according to claim 1 in which said executing an attached at least a drag and drop function upon selection of the representation of said received input, comprises manipulating an object associated with the representation of said received input.

13. The method according to claim 1 in which said executing an attached at least a drag and drop function upon selection of the representation of said received input, comprises requesting the user choose from a list of functions desired to be executed by the user.

14. A device for acquiring user input by a computer having a command input device, a selection device and a display device, comprising:

a means for receiving an input;

a means for displaying a representation of said received input on the display device;

a means for attaching at least a drag and drop function to said displayed representation of said received input on the display device;

a means for attaching another fuinction to the representation of a result of said received input on the display device; and a means for executing said attached at least a drag and drop function upon selection of said displayed representation of said received input.

15. The device according to claim 14 further comprising:

a means for executing said attached another function upon selection of the representation of the result.

16. The device according to claim 14 further comprising:

a means for anticipating a complete input from a partial received input; and a means for completing the partial received input wherein the receipt of additional input is not required.

17. The device according to claim 14 in which said means for attaching at least a drag and drop function to a representation of said received input on the display device, comprises a means for attaching a function to a character representation of said received input.

18. The device according to claim 14 in which said means for attaching at least a drag and drop function to a representation of said received input on the display device, comprises a means for attaching a function to a graphical representation of said received input.

19. The device according to claim 14 in which said means for executing an attached at least a drop and drag function upon selection of the representation of said received input, comprises a means for manipulating the representation of said received input on the display device.

20. The device according to claim 14 in which said means for executing an attached at least a drop and drag function upon selection of the representation of said received input, comprises a means for manipulating an object associated with the representation of said received input.

21. The device according to claim 14 in which said means for executing an attached at least a drop and drag function upon selection of the representation of said received input, comprises a means for requesting the user choose from a list of functions desired to be executed by a user.

22. A computer program product on a computer usable medium, the computer usable medium having computer usable program means embodied therein for acquiring user input, the computer usable program means comprising:

a means for receiving an input;

a means for displaying a representation of said received input on the display device;

a means for attaching at least a drag and drop function to said displayed representation of said received input on the display device;

a means for attaching another function to the representation of a result of said received input on the display device; and a means for executing said attached at least a drag and drop function upon selection of said displayed representation of said received input.

23. The computer program product according to claim 22 further comprising:

a means for executing said attached another function upon selection of the representation of the result.

24. The computer program product according to claim 22 further comprising:

a means for anticipating a complete input from a partial received input; and a means for completing the partial received input wherein the receipt of additional input is not required.

25. The computer program product according to claim 22 in which said means for attaching at least a drag and drop function to a representation of said received input on the display device, comprises a means for attaching a function to a character representation of said received input.

26. The computer program product according to claim 22 in which said means for attaching at least a drag and drop function to a representation of said received input on the display device, comprises a means for attaching a function to a graphical representation of said received input.

27. The computer program product according to claim 22 in which said means for executing an attached at least a drag and drop function upon selection of the representation of said received input, comprises a means for manipulating the representation of said received input on the display device.

28. The computer program product according to claim 22 in which said means for executing an attached at least a drag and drop function upon selection of the representation of said received input, comprises a means for manipulating an object associated with the representation of said received input.

29. The computer program product according to claim 22 in which said means for executing an attached at least a drag and drop function upon selection of the representation of said received input, comprises a means for requesting the user choose from a list of functions desired to be executed by a user.

* * * * *

UNITED STATES PATENT AND TRADEMARK OFFICE
CERTIFICATE OF CORRECTION

PATENT NO. : 6,600,498 B1
DATED : July 29, 2003
INVENTOR(S) : Chow

It is certified that error appears in the above-identified patent and that said Letters Patent is hereby corrected as shown below:

<u>Title page,</u>
Item [73], Assignee, "Intenational Business Machines" should read -- International Business Machines --.

<u>Column 1,</u>
Line 30, "friendliness. The" should read -- friendliness." The --.

<u>Column 13,</u>
Line 35, the word "fuinction" should read -- function --.

Signed and Sealed this

Twenty-first Day of October, 2003

JAMES E. ROGAN
*Director of the United States Patent and Trademark Office*